No. 867,262. PATENTED OCT. 1, 1907.
G. ERMOLD.
TAPPING DIE.
APPLICATION FILED NOV. 20, 1906.

Witnesses
David Peyne
H. J. Buhrlier

Inventor
George Ermold
By his Attorneys

UNITED STATES PATENT OFFICE.

GEORGE ERMOLD, OF ELIZABETH, NEW JERSEY.

TAPPING-DIE.

No. 867,262.          Specification of Letters Patent.          Patented Oct. 1, 1907.

Application filed November 20, 1906. Serial No. 344,195.

*To all whom it may concern:*

Be it known that I, GEORGE ERMOLD, a citizen of the United States, residing in Elizabeth, in the county of Union and State of New Jersey, have invented certain new and useful Improvements in Tapping-Dies, of which the following is a specification.

This invention relates to certain improvements in tapping dies, by which rods, tubes, and similar articles are provided with screw-threads.

The tapping dies heretofore used are made of steel and cut from a steel rod of the size of the die. After the blank for the die is cut off, it is then provided with drill holes, the central one of which is for receiving the cutting thread, and radial openings communicating with the central drill hole and with two drill holes near the circumference of the blank, while the third radial opening is cut through the blank so as to permit the spreading of the cutting jaws for using the die with different sizes of rods or tubes, the drill holes then serving for imparting a certain spring action to the threading jaws. The spreading of the die is produced by means of a conical screw forced into the open end of the die. As there is only a small thickness of stock between the drill holes near the circumference of the die, the dies frequently break at one of these points, which is a considerable source of annoyance and expense, and necessitates the buying of new dies.

The object of this invention is to furnish an improved die which can be readily spread apart and adjusted to different diameters of articles to be threaded without liability to breakage and which is firmly held within the stock after being inserted therein and adjusted to the required size of article to be threaded; and for this purpose the invention consists of a tapping die which comprises the novel features of construction to be hereinafter described and claimed.

Figure 1:
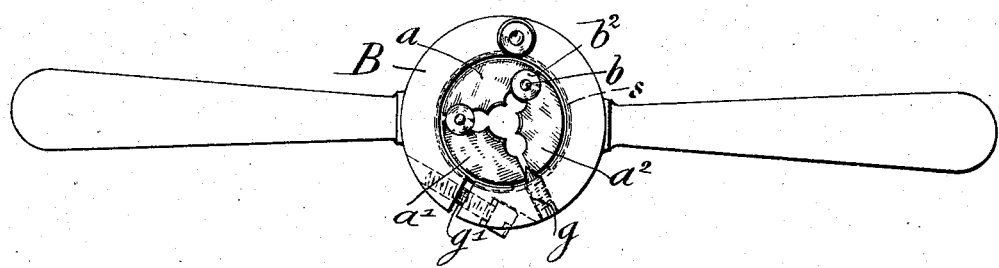
Figure 2:
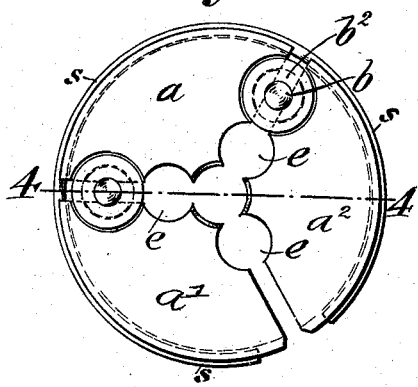
Figure 3:
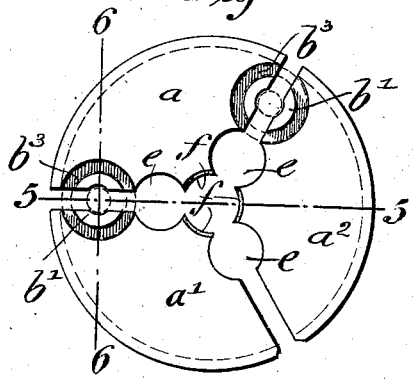
Figure 4:
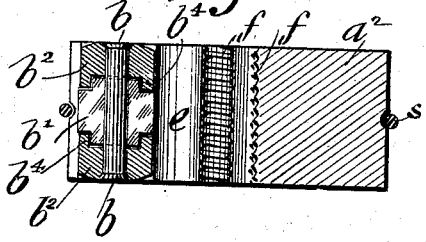
Figure 5:
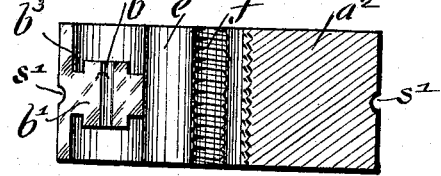
Figure 7:
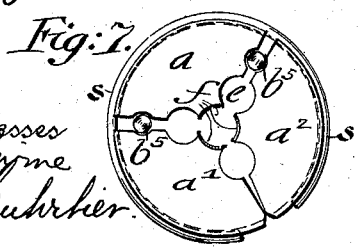
Figure 6:
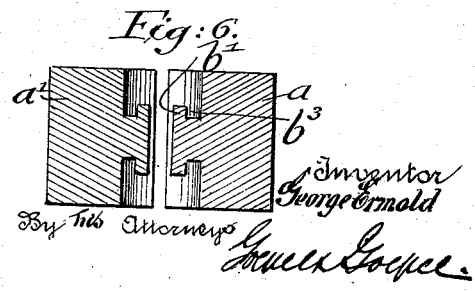

In the accompanying drawings, Figure 1 is a side-elevation of my improved tapping die shown as inserted into a stock with which it is to be used, Fig. 2 is a side-elevation of the die detached from the stock, and drawn on a larger scale, Fig. 3 is also a side-elevation of the die, showing the connecting caps for the pivots and the exterior retaining spring removed, Figs. 4 and 5 are vertical transverse sections respectively on lines 4, 4, Fig. 2, and 5, 5, Fig. 3; Fig. 6 is a detail vertical transverse section on line 6, 6, Fig. 3, and Fig. 7 is a side-view of a simplified construction of the improved tapping die.

Similar letters of reference indicate corresponding parts throughout the several figures.

Referring to the drawings, $a$, $a^1$, $a^2$ represent the three sections of which my improved tapping die is composed. Each of the sections $a^1$, $a^2$ is connected with the section $a$ by a pivotal connection. This connection comprises lugs or ears $b^1$ of segmental shape formed on the meeting ends of said sections, said ears being provided upon their opposing faces with upright grooves $b^\times$. The ears $b^1$ are provided upon their upper and lower surfaces with approximately semicircular grooves $b^3$ which receive flanges or shoulders $b^4$ of retaining caps $b^2$ which are connected by means of pivot-pins $b$ engaging the grooves $b^\times$ and riveted or upset at their ends in order to retain the caps $b^2$ on the ears $b^1$ and thus insure a secure pivotal connection between the die-sections. Instead of the pivot-pin $b$, a screw may be used to pivotally connect the die-sections.

Adjacent to the pivot connections of the die-sections $a$, $a^1$, $a^2$ are arranged clearing openings $e$ which form inwardly projecting portions or jaws $f$, the inner faces of which are threaded in the usual manner. Between the die-sections $a^1$ and $a^2$ is arranged, as a continuation of the clearing opening $e$, a radial slot by means of which the die-sections $a^1$, $a^2$ can be approached towards each other or moved away from each other on the pivot connections of the die-sections, so as to adapt the tapping jaws $f$ for cutting screw-threads on rods or tubes of iron or steel or other material. This is accomplished by placing the tapping die into a stock B, then adjusting the same to the required diameter by means of a set-screw $g$ having an inner tapering end, said set-screw being arranged in the circular portion of the stock. When the tapping die is adjusted to the required size of article to be threaded the circular portion of the stock is tightly applied to the same by means of a tightening screw $g^1$, as shown clearly in Fig. 1. The tapping die is now in position to be applied to the article to be tapped in the usual manner.

My improved tapping die is made from a solid steel rod by cutting off solid blanks of the width of the size of the article to be tapped. This solid blank is then provided with a central opening or center hole and adjacent thereto with the clearing openings $e$. Adjacent to the two clearing openings $e$ are arranged ears for the pivots $b$ which are provided with shouldered caps $b^2$, through which an opening or hole for the pivots is drilled, and the die-sections then cut off in radial direction. The pivot connection between the sections $a$, $a^1$, $a^2$ is then produced by placing the caps $b^2$ and pivots $b$ in position and upsetting or riveting the ends of the pivots over the caps. A radial slot is then cut from the third clearing opening $e$ in outward direction and a wire spring $s$ placed around the sections on a central groove $s^1$ of the same, said spring serving to hold the parts together and serving also for positioning the die in the circular portion of the stock, which is for this purpose provided with an inner groove into which the projecting end of the spring $s$ is inserted so that the sections of the die may be tightly clamped by the clamping screw $g^1$. The tapping die, after being made up from the blanks, has to be hardened in the usual manner. The die may be made of only two sections, if desired, in which case there is obviously only one pivotal connection.

Instead of using the caps and pivots for connecting the die-sections at two points as before described, a simpler pivot connection can be made, as shown in Fig. 7. In this case the caps are dispensed with and simply a pivot-pin $b^5$ inserted in corresponding grooves in the adjacent walls of the sections $a$, $a^1$, $a^2$, the spring $s$ being then placed in position to hold the parts together. The ends of the pivots $b^5$ are also riveted, so as to prevent their dropping out. The spring brings the inner ends of the sections $a^1$, $a^2$ together, said adjacent ends being preferably cut off at their outward ends with a slight taper so as to facilitate the insertion of the inner conical end of the set-screw $g$ when the tapping die is set for the required diameter of the rod or tube to be threaded.

The advantages of my improved tapping die are, first, that the same is not liable to breakage and splitting, but is always ready for use; secondly, that articles of different diameters can be tapped by the same owing to the facility with which the sections can be spread apart or approached towards each other; and, thirdly, that owing to the adjustability to different sizes of diameters, a smaller number of tapping dies is required, while heretofore, owing to the fixed tapping jaws, a large number of tapping dies was required, one die being required for each size. One of my improved tapping dies takes the place of two or three of the old-style tapping dies and is much more lasting as no breakage of the parts takes place.

Having thus described my invention, I claim as new and desire to secure by Letters Patent:

A tapping die comprising sections having tapping jaws separated by clearance openings and radial slots, grooved arc-shaped ears made integral with the adjacent ends of the die-sections, caps fitting over said ears and having shoulders fitting into the grooves thereof, and pivots passing through said caps and ears for holding the sections together.

In testimony, that I claim the foregoing as my invention, I have signed my name in presence of two subscribing witnesses.

GEORGE ERMOLD.

Witnesses:
HENRY J. SUHRBIER,
KARL KAELBLE.